(12) United States Patent
Baker

(10) Patent No.: US 11,692,714 B2
(45) Date of Patent: *Jul. 4, 2023

(54) NONCOMBUSTIBLE FIREPLACE SURROUND APPARATUS

(71) Applicant: Michael T Baker, Germantown, TN (US)

(72) Inventor: Michael T Baker, Germantown, TN (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/899,813

(22) Filed: Jun. 12, 2020

(65) Prior Publication Data

US 2021/0388990 A1 Dec. 16, 2021

(51) Int. Cl.
*F24B 1/198* (2006.01)
*C04B 20/00* (2006.01)
*C04B 28/04* (2006.01)
*C04B 111/28* (2006.01)

(52) U.S. Cl.
CPC .......... *F24B 1/198* (2013.01); *C04B 20/0048* (2013.01); *C04B 28/04* (2013.01); *C04B 2111/28* (2013.01)

(58) Field of Classification Search
None
See application file for complete search history.

(56) References Cited

U.S. PATENT DOCUMENTS

| | | | |
|---|---|---|---|
| 5,794,610 A | 8/1998 | Facchina | |
| 5,941,237 A * | 8/1999 | Shimek | F24B 1/1808 126/144 |
| D559,376 S | 1/2008 | Rumens | |
| D646,374 S | 10/2011 | Hadi | |
| D646,375 S | 10/2011 | Hadi | |
| 10,750,857 B1 * | 8/2020 | Baker | A47B 96/021 |
| 2002/0096171 A1 | 7/2002 | Lyons et al. | |
| 2003/0140570 A1 * | 7/2003 | Richmond | E04F 19/005 52/36.3 |
| 2005/0050805 A1 * | 3/2005 | Lyons | F24B 1/198 52/36.3 |
| 2008/0013931 A1 | 1/2008 | Bourne | |
| 2009/0205263 A1 * | 8/2009 | Heath | F24B 1/198 52/36.3 |
| 2016/0040889 A1 | 2/2016 | Rogers | |

* cited by examiner

*Primary Examiner* — John J Figueroa
(74) *Attorney, Agent, or Firm* — Spilman Thomas & Battle PLLC; William P. Smith; Shane P. Riley

(57) ABSTRACT

A fireplace surround structure is disclosed. The fireplace surround structure includes a mantel portion, a first vertical leg portion and a second vertical leg portion. The first leg portion and the second leg portion extend downward from the mantel portion at opposite ends to form a unitary fireplace surround structure. Each leg portion has a skeletal bar frame with a plurality of bar portions defining a three sided generally rectangular structure. Each of the sides has a lightweight non-combustible board portion attached on the exterior of the frame. The fireplace surround structure is open to one side and mountable on a wall surface. Each board portion is cast from a mix of Portland cement, silica, and cellulose fibers, which are combined and sintered into a flat board structure.

18 Claims, 4 Drawing Sheets

NONCOMBUSTIBLE FIREPLACE SURROUND APPARATUS

BACKGROUND OF THE INVENTION

The application generally relates to fireplace components. The application relates more specifically to a lightweight noncombustible fireplace surround apparatus.

Interior fireplaces are often located in houses or other buildings such as hotels, restaurants, etc. to provide heat and also to add to the aesthetic appeal. Usually the fireplace is located in a wall of the house and has a fireplace opening so that the occupants of the home may tend to a fire in the fireplace and the fireplace can radiate heat into the house. The brick, stone, other masonry or wood detail surrounding a fireplace opening is known in the art as a decorative fireplace surround. Fireplace surrounds are commonly used to enhance the look and feel of a fireplace and also function to cover otherwise unsightly features of the fireplace.

Fireplace surrounds were preciously masonry structures prepared brick-by-brick or stone-by-stone by skilled masons. Traditional brick or stone surrounds are composed of numerous individual bricks separated by grout or mortar recessed between the bricks. Such structures are durable, although prohibitively expensive to construct.

A fireplace may include, e.g., a firebox to contain the fire and any fuel or kindling that is used to create the fire. The firebox is typically found on the interior of the building that contains the fireplace, along with a chimney or flue that allows gas and other exhaust to escape the fireplace. With the installation of fireplaces, mantels and surrounds also serve to enhance interior design and to shield adjacent areas from exposure to hot embers and sparks that may be ejected from the fireplace.

Surrounds may also include a horizontal mantel shelf over the fireplace, connecting two vertical legs disposed at opposing sides of the fireplace. The mantel shelf and legs are often secured together as a single assembled piece that is mounted to the wall structure surrounding the fireplace. In other applications, the mantel shelf and leg members may be individually mounted to the wall structure surrounding the fireplace.

There have been previous fireplace surround assemblies that provide the appearance of real brickwork which are made from heavy and expensive artificial materials. Generally, such artificial surround assemblies are molded from cement compounds that are formed to simulate the texture of actual brick and then colored with dye or paint to imitate the appearance of manufactured bricks. For purposes of installation, such molded surrounds are usually cast as two units, i.e., a vertical legs and lintel unit and a horizontal hearth unit, which are positioned around a fireplace opening.

What is needed is a non-combustible fireplace surround that is light weight, inexpensive, and easy to install and to drop ship. Also needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF INVENTION

One embodiment relates to a fireplace surround structure. The fireplace surround structure includes a mantel portion, a first vertical leg portion and a second vertical leg portion. The first leg portion and the second leg portion extend downward from the mantel portion at opposite ends to form a unitary fireplace surround structure. Each leg portion has a skeletal bar frame with a plurality of bar portions defining a three sided generally rectangular structure. Each of the sides has a lightweight non-combustible board portion attached on the exterior of the frame. The fireplace surround structure is open to one side and mountable on a wall surface. Each board portion is cast from a mix of Portland cement, silica, and cellulose fibers, which are combined and sintered into a flat board structure.

Another embodiment relates to fireplace surround structure. The fireplace surround structure has a metal framework comprising a top horizontal portion and a bottom horizontal portion, a pair of short vertical side portions, and a front vertical side portion and a rear vertical side portion, the front vertical side portion and the rear vertical side portion connected at opposite ends by the short vertical side portions, respectively. Board portions are attached to the top horizontal portion, bottom horizontal portion, end portions and front vertical side portion to define a hollow enclosure open to the rear. A mantel portion has an extension tab protruding downward from the top horizontal portion for removably attaching the fireplace surround structure to a wall adjacent to a fireplace. The board portions comprise a mix of Portland cement, silica, and cellulose fibers, combined and sintered into a flat board structure.

Yet another embodiment relates to a fireplace surround structure. The fireplace surround structure includes a mantel portion, a first vertical leg portion and a second vertical leg portion. The leg portions extend downward from the mantel portion at opposite ends of the mantel portion to form a unitary fireplace surround structure. The leg portion have a skeletal bar frame having a three dimensional geometric shape with a hollow interior and an opening towards one side. The opening has tab members for engaging a flange portion of a mounting strip. The surround structure is enclosed on three sides by a flat board structure comprised of a mix of Portland cement, silica, and cellulose fibers, combined and sintered into the flat board structure.

Certain advantages of the embodiments described herein are a non-combustible Diamond Board® or SMART-BOARD® product wrapped around a metal frame, which provided a sturdy yet very light weight shelf with the non-combustible properties suitable for fireplace temperatures.

Another advantage is a decorative fireplace surround structure for placement above and/or around a fireplace that is lightweight for facilitation of transport and placement. Additionally, the fireplace surround structure exhibits a non-combustible quality heretofore undeveloped within the fireplace field, particularly for such articles that are provided with decorative aesthetic designs. Such a lightweight article is provided with all non-combustible components having dimensionally stable structural benefits for long-term mounting and usage, thereby providing a sufficiently strong fireplace surround structure with a low overall density and weight. A mounting component may be included as well for securing the fireplace surround structure against a wall or fireplace surface.

Yet another advantage is the increase in safety for the user in terms of installation considerations, and of the reliability of the fireplace surround structure to withstand high temperatures and thus reducing the propensity of the spread of fire emanating from a fireplace within an edifice.

Still another advantage is the ability to cast or mold the lightweight, noncombustible composite sheet material, to provide a faux surface covering with a texture imitating standard stone, brick, wood grain or similar building materials. The resultant moldings give the fireplace surround structure an appearance of a heavier, bulkier construction product while providing equivalent or greater fireproofing properties.

Alternative exemplary embodiments relate to other features and combinations of features as may be generally recited in the claims.

BRIEF DESCRIPTION OF DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
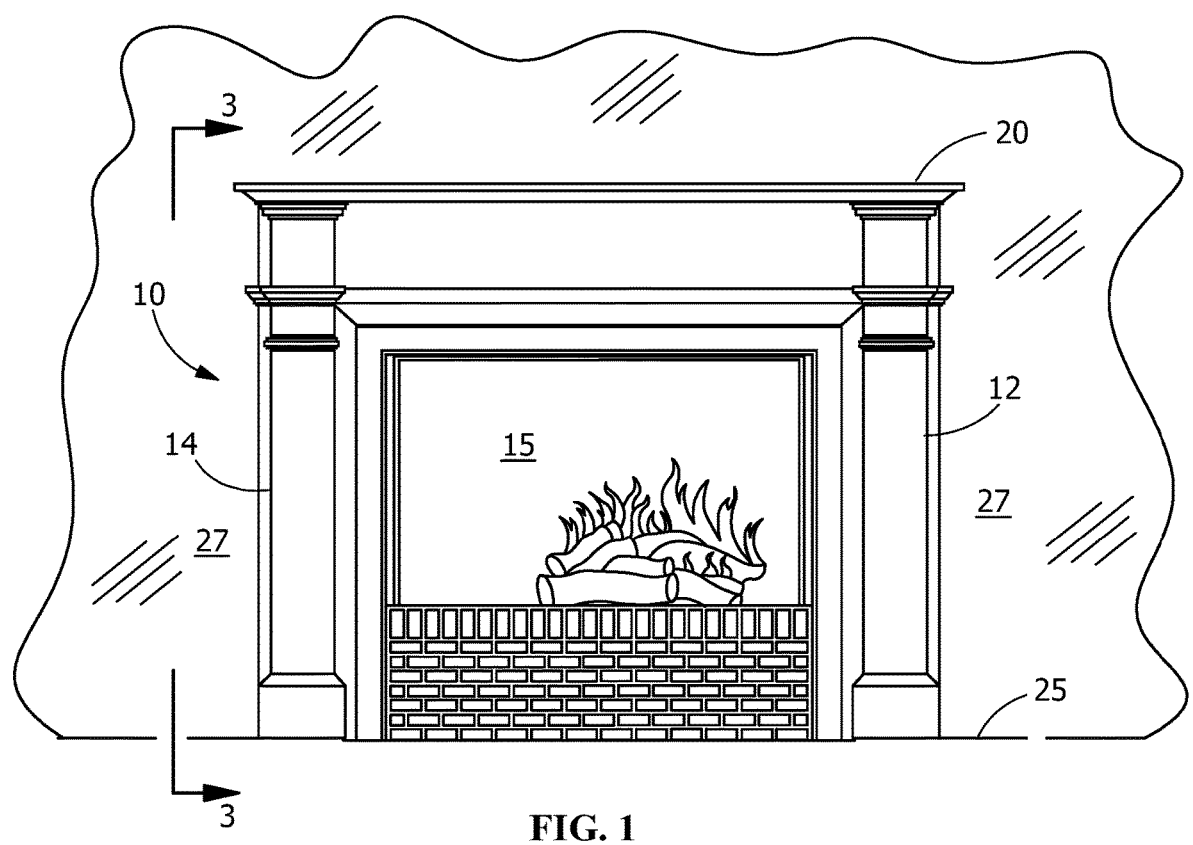
FIG. 1 shows an exemplary manufactured fireplace surround structure of the present invention.
Figure 2:
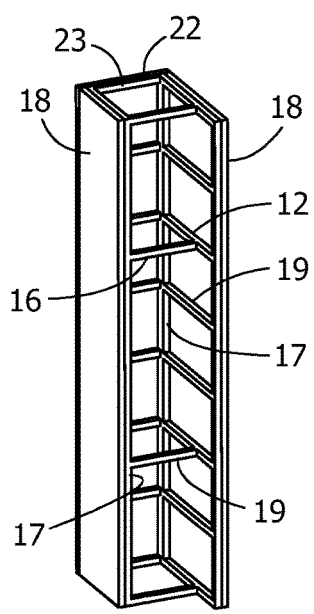
FIG. 2 shows an exemplary skeletal frame portion for a vertical leg portion of the fireplace surround structure of FIG. 1.
Figure 7:
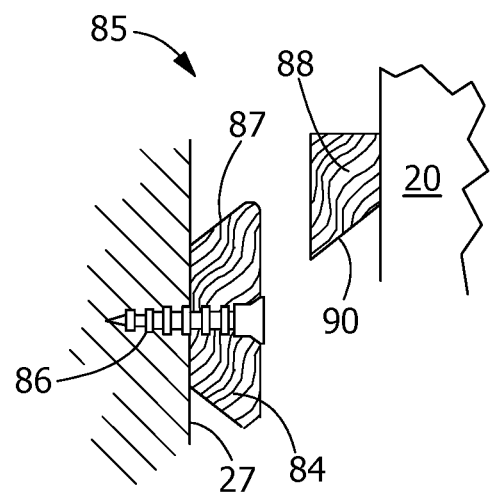
FIG. 7 shows an exemplary hangar rail arrangement.

Referring to FIGS. 1 & 2, a manufactured fireplace surround structure 10 is shown. The fireplace surround structure 10 is formed from a pair of generally parallel vertical leg portions 12, 14, that are spaced apart at a width sufficient to provide an unobstructed opening to a fireplace 15. A mantel portion 20 connects leg portions 12, 14 at the top ends 22 of leg portions 12, 14. Structure 10 is configured to be mounted on a floor base or hearth 25 and to the support wall 27 around fireplace 15. In one embodiment fireplace surround structure 10 is a unitary, free-standing, three-sided structure bordering a fireplace opening, and attachable to a wall surface. Fireplace surround structure 10 may be secured to the wall surface 27 surrounding the fireplace 15 via screws, anchors, mechanical fasteners, adhesives, hangers, rails or other commonly-used surface attaching means (FIG. 7).

FIG. 2 shows an exemplary skeletal frame portion for vertical leg portion 12. As will be understood by persons of skill in the art, the right side leg portion 12 is an opposite hand version of leg portion 14 on the left. In an alternate embodiment leg portions 12, 14 may be identical. Frame portion 14 is constructed of metal frame members 16. Frame members 16 may be preferably constructed of steel or other metal with a similar or higher melting point.

Frame members 16 include elongated vertical sections 17 and short cross-brace sections 19. A tab portion 23 is provided at the top end 22 of the vertical leg portions 12, 14, to provide an attachment point for mantel portion 20. Multiple holes (not shown) in tab portion 23 may be provided to receive screws, bolts or other fastening means. Exterior surface panels 18 are attached on the outer sides of vertical leg portions 12, 14 on three sides, with one side open, thus forming a hollow three-sided enclosure that abuts the wall and may wrap partially around a side of a fireplace surface that projects outwardly from the wall surface. The hollow interior of fireplace surround structure 10 is then enclosed by the wall surface when installed, thus providing an additional air gap for thermal resistance. In an alternate embodiment, fireproofing insulation may optionally be blown into the enclosed interior after installation for additional thermal resistance.

Figure 3:
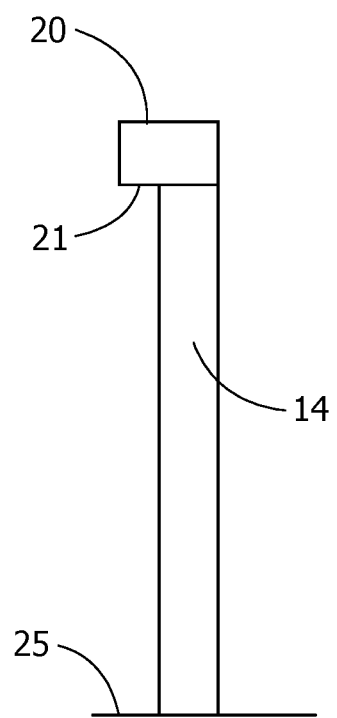
FIG. 3 shows an end view of the fireplace surround structure of FIG. 1.

FIG. 3 shows an end view of fireplace surround structure 10 taken along the lines 3-3 in FIG. 1. Mantel portion 20 may extend past leg portions 12, 14 to create an offset shelf 21 to receive a projecting face of the wall 27 or fireplace.

Figure 4:
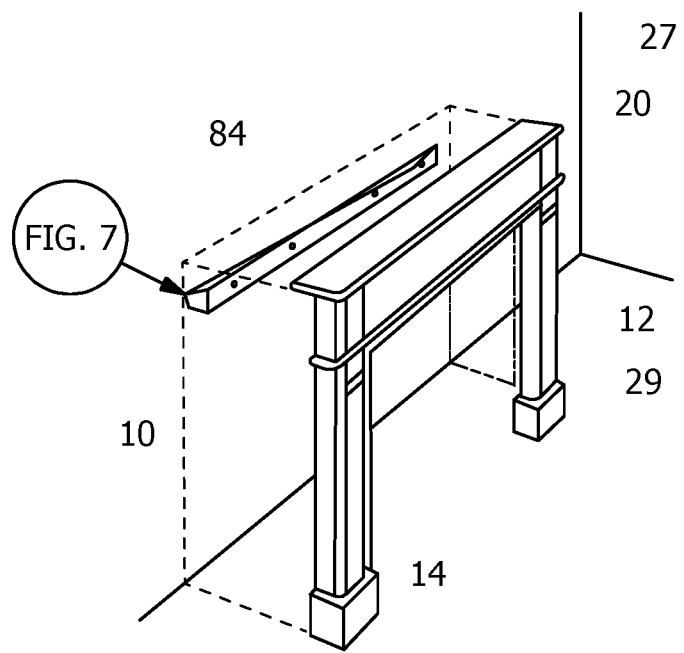
FIG. 4 shows an isometric view of an exemplary embodiment of fireplace surround structure.

FIG. 4 shows an isometric view of an exemplary embodiment of fireplace surround structure 10. A scribe molding 29 indicated by a dotted line may optionally be included on the inward facing surface of leg portions 12, 14. The scribe molding conceals any gap between the front surface of surround structure 10 and wall 27, fireplace surface, or any other material adjacent structure 10.

Figure 5:
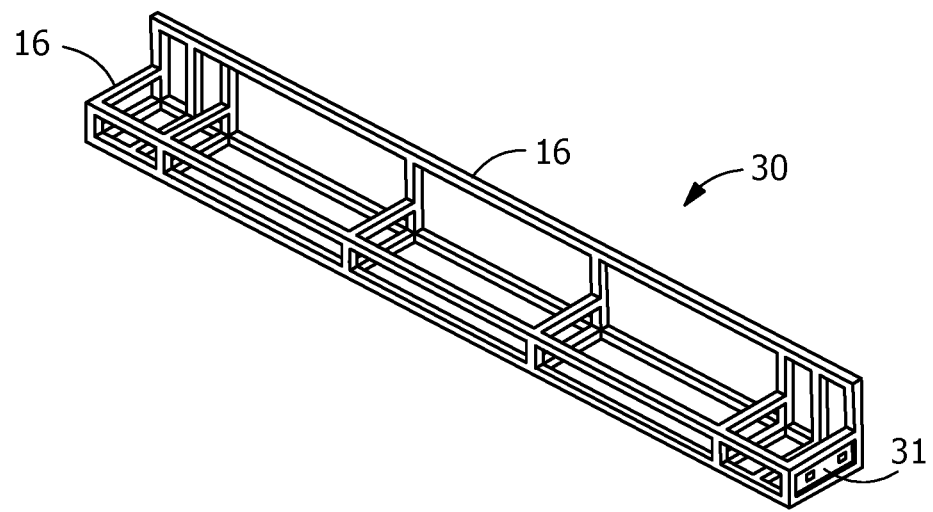
FIG. 5 shows a frame portion without surface panels for an exemplary embodiment of a leg portion.

FIG. 5 shows a frame portion 30 without surface panels for an exemplary embodiment of a leg portion 12, 14. Extra cross-bracing members 19 may be included adjacent top and bottom ends of leg portions to provide additional bracing adjacent the ends and attachments for mounting hardware 31.

Fireplace surround structure 10 is individually handcrafted. Fireplace surround structure 10 is constructed from a set of materials namely smartboard, iron frame and polyurethane glue. The outer shell material is a Smartboard® or Smartwood® which are produced from a mix of Portland cement, silica and special cellulose fibers. In an embodiment the flat board portions may be cast or molded to provide a surface texture of a faux building material such as wood grain, stone or brick.

The lightweight resilient board structure may be contacted and attached to said metal framework by said adhesive; wherein said board structure covers all but one long side of said metal framework; and wherein said metal framework includes extensions therein within said uncovered long side such that said extensions provide attachment means for mounting to a wall. Furthermore, the overall surround structure 10 boards may exhibit a range of densities (weight per length) of 53 grams per cubic meter ($g/m^3$) to 123.7 $g/m^3$, more preferably from 70.6 $g/m^3$ to 105.9 $g/m^3$, and most preferably about 84.8-91.8 $g/m^3$. As well, the level of non-combustibility of the overall surround structure exhibits no immolation or flammability up to 753.7° C. (Celsius) for at least 30 minutes of exposure, preferably at least 60 minutes, with only a potential loss of dimensional stability (such as cracking and/or slight deformations) upon exposure at such a high temperature over such a time frame.

The overall character of this mix makes the material by itself a noncombustible one. It can withstand an intense fire for about 105 minutes before structure 10 cracks or breaks, but will not burn. The iron frame and polyurethane glue of the assembled final product are also noncombustible, thus this invention is a noncombustible apparatus entirely.

Figure 6:
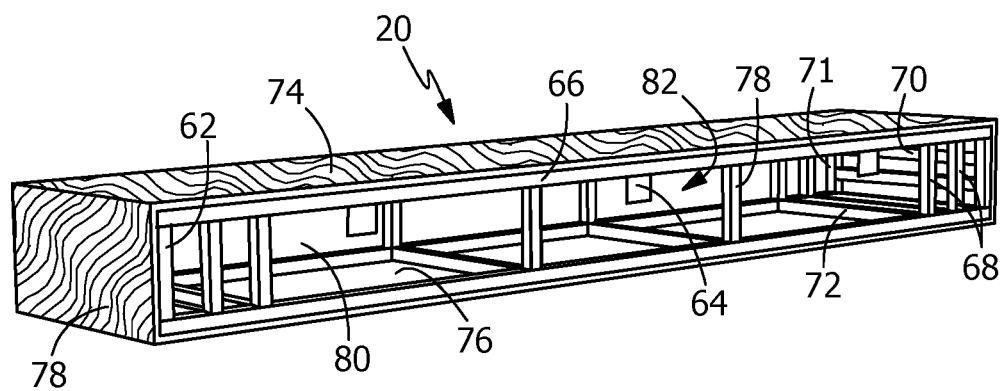
FIG. 6 a perspective rear view of a mantel portion in accordance with embodiments.

FIG. 6 depicts a side perspective rear view of the mantel portion 20 as disclosed herein. A frame 62 is shown with mounting extensions 64, horizontal lengthwise bars 66, vertical cross bars 68, horizontal cross bars 70, vertical side bars 71, and end-situated weight-bearing bars 72. To such a frame is applied a top lightweight non-combustible board 74, a bottom board 76, two side vertical boards 78 and a front vertical board 80. The opening 82 thus allows for lowered overall density of the mantel portion 20 and access to the mounting extensions for wall installation purposes.

Referring next to FIG. 7 an exemplary mitered hangar rail arrangement is shown. A mounting bracket 85 may be used, a horizontal rail 84 with secured wall mounting hardware 86 fixedly attached to wall 27. A tapered top edge 87 on rail 84 is arranged to receive a complementary tapered bottom edge 90 on hangar rail 88 attached to surround structure 10.

Figure 8:
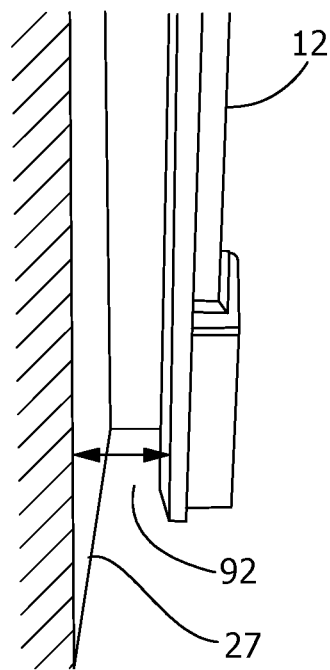
FIG. 8 shows a projection air gap between the rear of the mantel legs and wall.

Referring next to FIG. 8, a projection air gap indicated by arrow 92 may optionally be provided between the rear of the mantel legs 12, 14, and wall 27.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims.

It is important to note that the construction and arrangement of the fireplace surround structure as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A fireplace surround structure comprising:
   a mantel portion, a first vertical leg portion and a second vertical leg portion;
   the first leg portion and the second leg portion extending downward from the mantel portion at opposite ends of the mantel portion to form a unitary fireplace surround structure;
   each of the mantel portion, first leg portion, second leg portion comprising a skeletal bar frame;
   the skeletal bar frame comprising a plurality of bar portions defining a three sided generally rectangular structure;
   each of the three sides having a lightweight non-combustible board portions;
   the structure being open at a fourth side; and
   wherein each of the board portions comprises a mix of Portland cement, silica, and cellulose fibers, combined and sintered into a flat board structure.

2. The fireplace surround structure of claim 1, wherein the top and bottom frame portions are rectangular.

3. The fireplace surround structure of claim 1, wherein the top and bottom frame portions are planar.

4. The fireplace surround structure of claim 1 wherein the flat board structure has a density in a range of 53 grams per cubic meter (g/m$^3$) to 123.7 g/m$^3$.

5. The fireplace surround structure of claim 1, wherein the fireplace surround structure is non-combustible when exposed to temperatures up to 753.7° Celsius.

6. The fireplace surround structure of claim 1, wherein the at least one tab members are arranged to support the fireplace surround structure projecting from the vertical surface by engaging a flange extending upwardly from the mounting strip.

7. The fireplace surround structure of claim 1, wherein each board portion fastened to the skeletal frame with a non-combustible polyurethane adhesive.

8. The fireplace surround structure of claim 7, wherein the adhesive is applied to each of the frame surfaces to which at least one of the board portions is contacted and attached.

9. A fireplace surround structure comprising:
   a metal framework comprising:
   a mantel portion, a first vertical leg portion and a second vertical leg portion;
   the first leg portion and the second leg portion extending downward from the mantel portion at opposite ends of the mantel portion to form a unitary fireplace surround structure;
   each of the mantel portion, first leg portion and second leg portion comprising a skeletal bar frame;
   the skeletal bar frame comprising a plurality of bar portions defining a generally rectangular structure;
   a plurality of board portions adhesively attached to at least three sides of each mantel portion, first leg portion and second leg portion to define a hollow enclosure open to the rear; and
   the mantel portion having at least one extension tab protruding downward from the top horizontal portion for removably attaching the fireplace surround structure to a wall adjacent to a fireplace;
   wherein the plurality of board portions comprise a mix of Portland cement, silica, and cellulose fibers, combined and sintered into a flat board structure.

10. The fireplace surround structure of claim 9, wherein the flat board portions are cast in a mold to provide a surface texture of a faux building material.

11. The fireplace surround structure of claim 10, wherein the faux building material is selected from one of wood, stone or brick.

12. The fireplace surround structure of claim 9, wherein the frame portions are planar.

13. The fireplace surround structure of claim 9, wherein the flat board structure has a density in a range of 53 grams per cubic meter (g/m$^3$) to 123.7 g/m$^3$.

14. The fireplace surround structure of claim 13, wherein the fireplace surround structure is non-combustible when exposed to temperatures up to 753.7° Celsius.

15. The fireplace surround structure of claim 9, wherein the at least one tab members are arranged to support the fireplace surround structure projecting from the vertical surface by engaging a flange extending upwardly from the mounting strip.

16. The fireplace surround structure of claim 9, wherein each board portion fastened to the skeletal frame with a non-combustible polyurethane adhesive.

17. A fireplace surround structure comprising:
- a mantel portion, a first vertical leg portion and a second vertical leg portion;
- the first leg portion and the second leg portion extending downward from the mantel portion at opposite ends of the mantel portion to form a unitary fireplace surround structure;
- each of the first leg portion, second leg portion comprising a skeletal bar frame having a three dimensional geometric shape having a hollow interior and an opening;
- the opening comprising tab members for engaging a flange portion of a mounting strip;
- the three dimensional geometric shape enclosed on three sides by a flat board structure comprised of a mix of Portland cement, silica, and cellulose fibers, combined and sintered into the flat board structure.

18. The fireplace surround structure of claim 17, wherein the flat board structure has a density in a range of 53 grams per cubic meter ($g/m^3$) to 123.7 $g/m^3$; and wherein the fireplace surround structure is non-combustible when exposed to temperatures up to 753.7° Celsius.

* * * * *